United States Patent Office 3,350,459
Patented Oct. 31, 1967

3,350,459
MERCAPTO-NITROPHENOLS AND A PROCESS FOR PREPARING THEM
Heinrich Pelster, Leverkusen, and Rudolf Heiss, Cologne-Stammheim, Germany, assignors to Farbenfabriken Bayer Aktiengesellschaft, Leverkusen, Germany, a German corporation
No Drawing. Filed Oct. 8, 1963, Ser. No. 314,637
Claims priority, application Germany, Nov. 16, 1962, F 38,325; Mar. 14, 1963, F 39,245
9 Claims. (Cl. 260—609)

Object of this invention are monomercapto-mono-nitrophenols of the general formulae

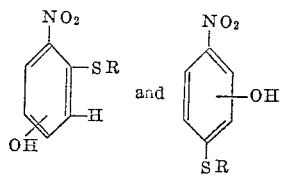

wherein R represents hydrogen, an alkyl group, a substituted alkyl group, a cycloalkyl group, an aryl group or a substituted aryl group and a process for preparing them.

It is known that o- or p-chloronitrobenzenes can be reacted under much milder conditions than chlorobenzene with nucleophilic agents such as alcoholates or amines to form the corresponding alkoxy- or amino-nitrobenzenes. This greater reactivity of the chlorine atom is known to be due to the fact that owing to the superimposition of the mesomeric effect of the nitro group and the inductive effect of the chlorine, the corresponding C-atom is highly activated and therefore facilitates nucleophilic exchange of the chlorine. This facilitation of the nucleophilic substitution of chlorine should be eliminated or at least greatly attenuated if there is present, in the o- or p-position to the nitro group or to the chlorine atom, another substituent which can enter into a strong mesomeric relationship to the nitro group. The mesomerism between the nitro group and the halogen is then to a large extent suppressed in favour of the other substituent. Examples of such substituents are, in order of increasing activity:

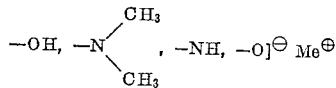

Thus, the reactivity should be most powerfully suppressed by the phenolate anion.

On this basis, it was to be expected that exchange of chlorine for nucleophilic reagents would become much more difficult in the case of 3-chloro-4-nitrophenols and 5-chloro-2-nitrophenols in alkaline media.

Furthermore, it is known that side reactions may occur to a large extent when (o- or p-)chloronitrobenzenes are reacted with mercaptans. Thus when p-nitrochlorobenzene is reacted with methylmercaptan in an alkaline medium, there is no replacement of chlorine by the methylmercapto group but almost exclusive reduction of the nitro group.

A process for the preparation of monomercapto-mononitrophenols of the general formulae

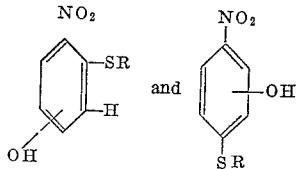

wherein R represents hydrogen, an alkyl group, a substituted alkyl group, a cycloalkyl group, an aryl group and a substituted aryl group has now been found in which monochloromononitrophenols are reacted with a mercapto compound of the general formula R—SH, in which R has the meaning given above, in a liquid medium at temperatures between 0° and 120° C.

The reaction, which is preferably carried out at 20° to 100° C., takes place quite smoothly without side reactions and gives high yields of mercapto-nitrophenols. To carry out the process, 1 mol. of the corresponding halogen nitrophenol is reacted with 1 to 1.5 mols., preferably 1.0 to 1.1 mol., of a mercaptan in the presence of 2 mols. of an inorganic base, such as an alkali metal hydroxide or alkaline earth hydroxide, in an aqueous, alcoholic or aqueous-alcoholic medium.

The following are examples of mercapto compounds that can be used: Methylmercaptan, ethylmercaptan, propylmercaptan, isopropylmercaptan, dodecylmercaptan, allylmercaptan, thiophenol, thiocresols, thionaphthols, thioglycol, mercaptoanisole, mercapto-acetic acid, hydrogen sulphide and polysulphides ($H_2S_x$).

The reaction may be carried out in water, but also in alcohols such as methanol and ethanol or in mixtures of these alcohols with water. It may be carried out at normal pressure but also at elevated pressure.

The mercapto compound formed is separated off by acidifying the reaction mixture and is obtained in a high degree of purity at a yield of over 90% of the theoretical yield.

In a further method of carrying out the process, the hydrogen of the OH group in 3-nitro-4-chlorophenol or 3-nitro-6-chlorophenol is replaced by a protective group X and then reacted with a mercaptan of the general formula R—SH in the presence of an inorganic base, the protective group X then being removed, in accordance with the following reaction scheme:

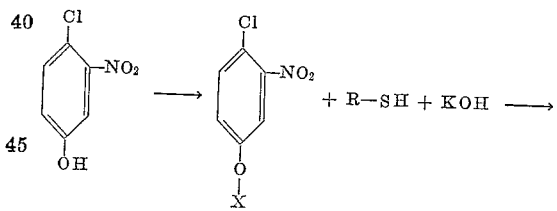

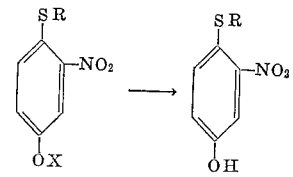

Radicals which are not split off under the reaction conditions of the exchange reaction with mercaptans but which can be split under milder conditions after the reaction is completed without the mercapto nitrophenol formed in the reaction being changed may be used as protective group X. This may conveniently be done by esterifying or etherifying the hydroxyl group. X may therefore be, for example, one of the radicals:

—$CH_2$—OR′, >$CH_2$, —$SO_2$—R′, >$SO_2$ (R′=alkyl- or aryl radicals)

The hydroxyl group may be esterified with, for example, methane sulphochloride, benzene sulphochloride or toluene sulphochloride. A suitable etherifiying agent is, for example, chlorodimethylether.

Thus, to prepare the mercapto nitrophenols according to the invention, the hydrogen of the OH group in 3-nitro-4-chlorophenol or in 3-nitro-6-chlorophenol is first replaced by the radical X. This is done by reacting 3-nitro-4-chlorophenol or 3-nitro-6-chlorophenol in the presence of bases, with, for example, halogen methyl-alkyl ethers, dihalogen methane, halides of sulphuric acid, or halides of sulphonic acids such as methane sulphochloride, benzene sulphochloride or dimethyl sulphamidic acid chloride.

1 mol. of the compounds of the formulae

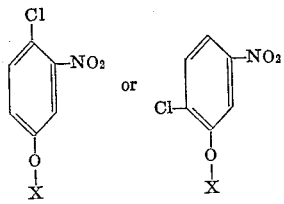

the hydroxyl group of which has been protected by X which has the meaning given above, is then reacted with 1 to 2 mols. of a mercaptan of the general formula R—SH and an equal quantity of an alkali metal hydroxide at 0° to +60° C., preferably 15° to 26° C.:

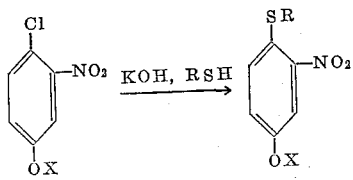

The solvent is preferably selected from the following: Acetone, methylethylketone, dimethylformamide, acetonitrile, tetramethylenesulphone and the like and mixtures of these with each other and mixtures of the said solvents with alcohols such as ethanol.

The resulting derivatives of mercapto-nitrophenols may be isolated from the reaction mixture. The group X is then split off by saponification by the usual methods.

Saponification may also be carried out directly in the reaction mixture without first isolating the intermediate stage, and the mercapto-nitrophenols according to the invention may be isolated in yields between 70% and 80% of the theoretical yield.

The mercapto-nitrophenols prepared by the above process may be oxidized by known methods to sulphones and then reduced and diazotized according to the following reaction scheme:

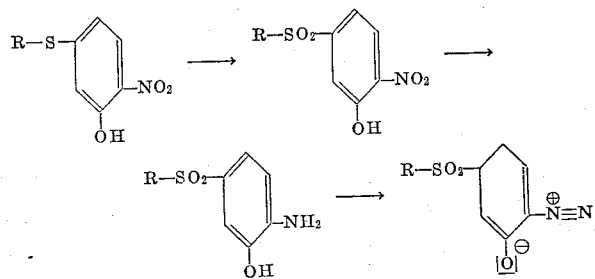

The monomercapto-mononitrophenols can therefore be used as intermediate products for the production of metallizable azo dyestuffs.

The mercapto-nitrophenols prepared by the process may be converted by known methods into carbamates which are distinguished by their high toxicity to fungi. Thus, for example, 3-methylmercapto-4-nitrophenyl-N-methyl-carbamate used at a concentration of 100 mg. in 1 litre of potato-dextrose-agar completely inhibits the growth of the following phytopathogenic soil fungi: *Corticium rolfisii, Sclerotinia sclerotiorum, Verticillium alboatrum, Thielaviopsis basicola, Phytophthora captorum, Fusarium culmorum, Fusarium oxysporum* and *Fusarium solani*.

EXAMPLE 1

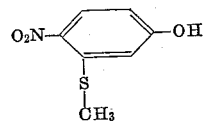

173.6 g. (=1 mol.) of 3-chloro-4-nitrophenol are dissolved in 300 ml. ethanol, and a solution of 80 g. sodium hydroxide in 550 ml. water is added with cooling and stirring. 24.6 litres (=1.1 mol.) of gaseous methylmercaptan is then introduced into the reaction mixture at 5°–10°, with cooling, and the reaction mixture is boiled under reflux for 3½ hours at an internal temperature of 80° C., a dark red solution being formed. The solution is cooled to 60° C. and acidified to pH 2–3 by adding about 210 ml. 20% hydrochloric acid dropwise. This precipitates 3-methyl-mercapto-4-nitrophenol in the form of orange crystals. Precipitation is completed by slowly cooling to +10° C. 3-methylmercapto-4-nitrophenol is filtered off by suction, washed with water and dried in vacuo.

*Yield.*—170 g. 3-methylmercapto-4-nitrophenol. M.P. 174.5°–175.5° C. (this corresponds to 92% of the theoretical yield).

The compound crystallizes from ethyl acetate/benzene 1:2 in orange needles of M.P. 175–176° C.

*Analysis.*—$C_7H_7NO_3S$ (185.2). Calculated: C, 45.41; H, 3.81; N, 7.57; O, 25.92; S, 17.28. Found: C, 45.41; H, 3.76; N, 7.73; O, 25.54; S, 17.4; MW, 190.

EXAMPLE 2

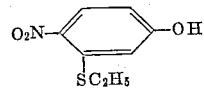

A solution of 80 g. (=2 mols.) sodium hydroxide in 550 ml. water followed by 68 g. (=1.1 mol.) ethyl mercaptan is slowly added, with cooling, to 173.6 g. 3-chloro-4-nitrophenol (=1 mol.) dissolved in 300 ml. ethanol. The mixture is then stirred for 15 minutes and boiled under reflux for 4 hours (internal temperature 80° C.). The mixture is then left to cool to 40° C. and about 260 ml. 15% hydrochloric acid is added dropwise until the pH of the solution is about 2–3. The solution is cooled to 10° C. and 3-ethylmercapto-4-nitrophenol which has precipitated in the form of orange crystals is filtered off by suction and washed with water until neutral. After drying in vacuo 270 g. of crude product is obtained which may be recrystallized from benzene (orange crystals).

*Yield.*—179 g. 3-ethylmercapto-4-nitrophenol (corresponding to 90% of the theoretical yield). M.P. 135°.

*Analysis.*—$C_8H_9NO_3S$ (199.2). Calculated: C, 48.24; H, 4.56; O, 24.10; N, 7.03; S, 16.07; MW, 199.2. Found: C, 48.30; H, 4.64; O, 24.26; N, 6.92; S, 15.62; MW, 195.

EXAMPLE 3

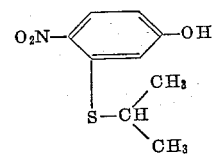

By a similar method to Examples 1 and 2, a mixture of 34.6 g. (=0.2 mol.) 3-chloro-4-nitrophenol, 60 ml. ethanol, 16 g. sodium hydroxide (0.4 mol.) and 120 ml. water is reacted with 15.2 g. (=0.2 mol.) isopropylmercaptan.

3-isopropylmercapto-4-nitrophenol is thus obtained in the form of yellow brown crystals.

*Yield.*—41 g. (96% of the theoretical yield).

The compound crystallizes from benzene in brown crystals, M.P. 129°–131° C.

*Analysis.*—C$_9$H$_{11}$NO$_3$S (213.2). Calculated: C, 50.70; H, 5.20; N, 6.57; O, 22.52; S, 15.01; MW, 213.2; nitrite number, 32.40. Found: C, 50.20; H, 5.22; N, 6.84; O, 22.15; S, 14.31; MW, 207; nitrite number, 32.45.

EXAMPLE 4

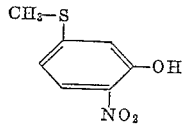

173.6 g. (=1 mol.) 5-chloro-2-nitrophenol are suspended in 500 ml. water and a solution of 80 g. (=2 mols.) sodium hydroxide in 600 ml. water is added with stirring. 24.6 litres (=1.1 mol.) gaseous methyl mercaptan are introduced into this mixture and the mixture is then heated for 4 hours under mild reflux. After acidifying the reaction mixture with 20% hydrochloric acid to pH 2–3, the mixture is cooled to 10° C. and 2-nitro-5-methyl-mercaptophenol which has precipitated in the form of dark crystals is removed by suction filtration. A small quantity of product may still be removed in the form of oil from the filtrate and crystallized with benzene/ligroin.

*Yield.*—146 g. 2-nitro-5-methylmercapto-phenol (79% of the theoretical yield).

The compound crystallizes from benzene/ligroin in the form of yellow brown needles of M.P. 75°–76° C.

*Analysis.*—C$_7$H$_7$NO$_3$S (185.2). Calculated: C, 45.41; H, 3.81; N, 7.57; O, 25.92; S, 17.28; MW, 185.2. Found: C, 45.46; H, 3.94; N, 7.71; O, 25.99; S, 17.29; MW, 188.

EXAMPLE 5

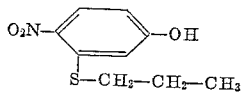

By a similar method to Example 2, a mixture of 34.7 g. (=0.2 mol.) 3-chloro-4-nitrophenol, 100 ml. ethanol, 16 g. sodium hydroxide (=0.4 mol.) and 100 ml. water is reacted with 15.2 g. (=0.2 mol.) n-propylmercaptan. 3-n-propylmercapto-4-nitrophenol is obtained in the form of brown crystals.

The compound crystallizes from benzene in red-brown crystals of M.P. 117°–118° C.

*Yield.*—34 g. (80% of the theoretical yield).

*Analysis.*—C$_9$H$_{11}$NO$_3$S (213.2). Calculated: S, 15.01%. Found: S, 14.75%.

EXAMPLE 6

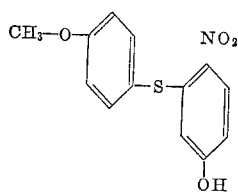

As described in Example 2 for 3-ethylmercapto-4-nitrophenol, a mixture of 17.4 g. (=0.1 mol.) 3-chloro-4-nitrophenol, 30 ml. ethanol, 8 g. sodium hydroxide (=0.2 mol.) and 55 ml. water is reacted with 17 g. (=0.12 mol.) 4-mercaptoanisole. 3-(p-methoxy-phenylmercapto)-4-nitrophenol is thus obtained in the form of brown crystals.

The compound crystallizes from methanol in red-brown crystals of M.P. 179° to 180° C.

*Yield.*—26 g. (94% of the theoretical yield).

*Analysis.*—C$_{13}$H$_{11}$O$_4$NS (277.3). Calculated: S, 11.5%. Found: S, 11.1%.

EXAMPLE 7

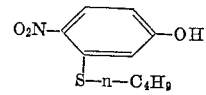

As in Example 2, 173.6 g. (=1 mol.) 3-chloro-4-nitrophenol, 300 ml. methanol, 80 g. (=2 mols.) sodium hydroxide and 700 ml. water are reacted with 95 g. (=1.05 mols.) n-butylmercaptan. The mixture is boiled under reflux for 6 hours and then worked up as in Example 2 and the substance is recrystallized from benzene. Orange-yellow crystals of M.P. 88°–90° C. are obtained.

*Yield.*—176 g. 3-n-butyl-mercapto-4-nitrophenol (77% of the theoretical yield).

*Analysis.*—C$_{10}$H$_{13}$NO$_3$S. Calculated: C, 52.86; H, 5.77; O, 21.12; N, 6.17; S, 14.08. Found: C, 52.43; H, 5.63; O, 21.82; N, 6.69; S, 13.90.

EXAMPLE 8

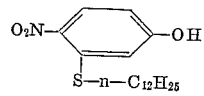

173.6 g. (=1 mol.) 3-chloro-4-nitrophenol, 300 ml. ethanol, 96 g. (=2.4 mols.) sodium hydroxide and 700 ml. water are reacted with 240 g. (=1.19 mols.) n-dodecylmercaptan by a method analogous to that of Example 2. After working up the reaction mixture, the crude product is recrystallized from ligroin. 3-n-dodecyl-mercapto-4-nitrophenol crystallizes in yellow platelets of M.P. 74°–75° C.

*Yield.*—243 g. (72% of the theoretical yield).

*Analysis.*—C$_{18}$H$_{29}$NO$_3$S (339.4). Calculated: C, 63.69; H, 8.61; O, 14.14; N, 4.13; S, 9.43. Found: C, 63.22; H, 8.50; O, 14.07; N, 4.23; S, 9.10.

EXAMPLE 9

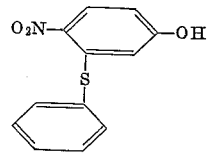

173.6 g. (=1 mol.) 3-chloro-4-nitrophenol, 300 ml. ethanol, 92 g. (=2.3 mols.) sodium hydroxide, 700 ml. water are reacted with 143 g. (=1.3 mols.) thiophenol by a method analogous to that in Example 2. The reaction mixture is boiled under reflux for 15 hours and then worked up as in Example 2. 3-phenyl-mercapto-4-nitrophenol crystallizes from benzene in yellow crystals of M.P. 185°–188° C.

*Yield.*—158 g. (64% of the theoretical yield).

*Analysis.*—C$_{12}$H$_9$NO$_3$S (247.2). Calculated: C, 58.30; H, 3.67; O, 19.42; N, 5.67; S, 12.94. Found: C, 58.39; H, 3.80; O, 18.96; N, 5.79; S, 12.70.

EXAMPLE 10

By similar methods to that described in Example 9, the following compounds are obtained from 3-chloro-4-nitrophenol and other thiophenols such as p-thiocresol, o- thiocresol, m-thiocresol, p-chlorothiophenol, o-chlorothiophenol and m-chlorothiophenol:

| | |
|---|---|
| 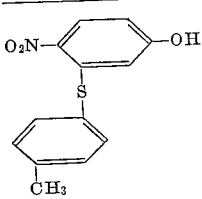 | 3-(p-toluyl-mercapto)-4-nitrophenol (yellow to red crystals from toluene; M.P. 197°–199°; yield: 52% of the theoretical). |
| 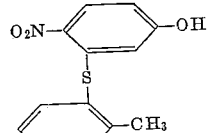 | 3-(o-toluyl-mercapto)-4-nitrophenol (yellow crystals from acetic ester/ligroin; M.P. 181°–182°; yield: 69% of the theoretical). |
| 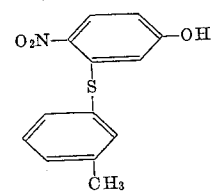 | 3-(m-toluyl-mercapto)-4-nitrophenol (yellow crystals from toluene; M.P. 179°–180.5°; yield: 87% of the theoretical). |
| 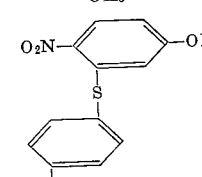 | 3-(p-chloro-phenyl)-mercapto-4-nitrophenol (orange crystals from toluene; M.P. 187°–188°; yield: 73% of the theoretical). |
| 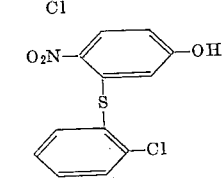 | 3-(o-chloro-phenyl-mercapto)-4-nitrophenol (orange crystals from xylene; M.P. 195°–196°; yield: 62% of the theoretical). |
| 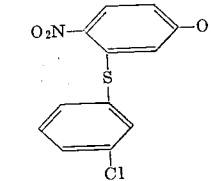 | 3-(m-chloro-phenyl-mercapto)-4-nitrophenol (yellow red crystals from toluene; M.P. 210°–211°; yield: 67% of the theoretical). |

EXAMPLE 11

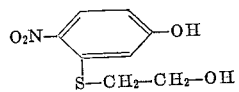

By the method of Example 2, 87 g. (=0.5 mol.) 3-chloro-4-nitrophenol, 150 ml. ethanol, 44 g. (=1.1 mol.) sodium hydroxide, 300 ml. water and 48 g. (=0.6 mol.) 2-mercapto-ethanol are boiled under reflux for 15 hours. 3-(2-hydroxy-ethyl-mercapto)-4-nitrophenol is obtained in the form of greenish yellow crystals of M.P. 159–160° by recrystallization from water.

Yield.—89 g., i.e. 78% of the theoretical yield.
Analysis.—$C_8H_9NO_4S$ (215.2). Calculated: C, 44.66; H, 4.22; O, 29.74; N, 6.51; S, 14.88. Found: C, 44.69; H, 4.32; O, 29.30; N, 6.47; S, 15.5.

EXAMPLE 12

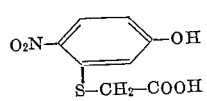

Using a method analogous to that in Example 2, 3-(carboxy-methyl-mercapto)-4-nitrophenol is prepared from 522 g. (=3 mols.) 3-chloro-4-nitrophenol, 408 g. (=10.2 mols.) sodium hydroxide in 2.5 litres of water, 900 ml. ethanol and 330 g. (=3.6 mols.) thioglycollic acid. The compound crystallizes from water in yellow brown crystals of M.P. 203°.

Yield.—495 g., i.e. 72% of the theoretical yield.
Analysis.—$C_8H_7NO_5S$ (229.1). Calculated: C, 41.93; H, 3.08; O, 34.91; N, 6.11; S, 13.96. Found: C, 41.95; H, 3.23; O, 34.60; N, 6.46; S, 14.25.

EXAMPLE 13

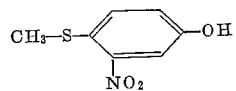

(A) 1736 g. (=10 mols.) 4-chloro-3-nitrophenol are dissolved in a solution of 475 g. (=11.9 mols.) NaOH in 3.5 litres of water. 1145 g. (=10 mols.) methane-sulphochloride are then added dropwise in the course of 1½ hours at such a rate that the reaction temperature does not rise above 55° C., and the mixture is then stirred for another 5 hours. Methane-sulphonic acid (4-chloro-3-nitro)-phenyl ester, which is precipitated as reddish yellow crystals, is removed by suction filtration, washed with water and then with ethanol and dried.

Yield.—1967 g. (i.e. 78% of the theoretical yield). M.P. 125–128° C.

The compound crystallizes from ethanol in colourless crystals M.P. 127°–128.5° C.

Analysis.—$C_7H_6NO_5SCl$ (251.5): S, 12.75; Cl, 14.15. S, 12.65; Cl, 14.15.

(B) 251.5 g (=1 mol.) methane-sulphonic acid-(4-chloro-3-nitro)-phenyl ester are suspended in 800 ml. acetonitrile. A solution of 1.3 mol. potassium methyl mercaptide in 400 ml. ethanol is then added dropwise, with stirring, at 15° to 20° C. in the course of 3 hours. (To prepare the mercaptide solution, 73 g. (=1.3 mol.) potassium hydroxide are dissolved in 400 ml. ethanol and 29 litres of gaseous methyl mercaptan are introduced into this solution through a gas meter.)

The mixture is stirred at room temperature for 24 hours. Methane-sulphonic acid-(3-nitro-4-methylmercapto)-phenyl ester, which has precipitated as yellow crystals, is then filtered off by suction, and a further quantity is obtained by concentrating the filtrate. The compound is washed with water, then with a small quantity of ethanol, and dried.

Yield.—225 g. (i.e. 85% of the theoretical yield). M.P. 122°–123.5° C.

(C) 225 g. (=0.85 mol.) methane-sulphonic acid-(3-nitro-4-methylmercapto)-phenyl ester are suspended in 400 ml. ethanol, 112 g. (=2 mols.) KOH in 350 ml. ethanol are added and the mixture is heated under reflux for ½ hour. After cooling to room temperature, the mixture is acidified with 17% HCl to pH 3 and stirred with 2 kg. ice. 3-nitro-4-methyl-mercaptophenol crystallizes in the form of yellow crystals, is filtered off by suction, washed with water, and dried in vacuo at 50° C.

Yield.—144 g. (i.e. 92% of the theoretical yield).

The compound may be obtained analytically pure by a single recrstallization, without filtration, from sodium hydroxide solution. 3-nitro-4-methylmercaptophenol crystallizes from benzene in orange-red crystals of M.P. 114°–115° C.

Analysis.—$C_7H_7NO_3S$ (185.2). Calculated: C, 45.41; H, 3.81; N, 7.57; O, 25.92; S, 17.28. Found: C, 45.46; H, 3.80; N, 7.29; O, 26.70; S, 17.20.

EXAMPLE 14

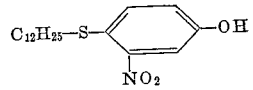

By a similar method to Example 13, 3-nitro-4-n-dodecyl-mercaptophenol (175 g. crude product) is obtained from 126 g. (=0.5 mol.) methane-sulphonic acid-(4-chloro-3-nitro)-phenyl ester, n-dodecyl-mercaptan and ethanolic KOH in acetonitrile.

The compound crystallizes from ligroin in orange red crystals of M.P. 59°–60° C.

*Yield.*—112 g. (i.e. 66% of the theoretical yield).

*Analysis.*—$C_{18}H_{29}NO_3S$ (339.4). Calculated: C, 63.69; H, 8.61; S, 9.43; N, 4.13; O, 14.14. Found: C, 63.54; H, 8.64; S, 9.30; N, 4.08; O, 15.00.

EXAMPLE 15

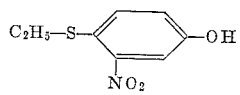

251.5 g. (=1 mol.) methane-sulphonic acid-(4-chloro-3-nitro)-phenyl ester (see Example 13A) are suspended in 600 ml. methyl ethyl ketone. A solution of 79 g. (=1.4 mol.) KOH, 87 g. ethylmercaptan (=1.4 mol.) in 300 ml. ethanol is added dropwise to this suspension with stirring at 20° to 25° C., and the mixture is then stirred for another 24 hours at room temperature. 450 ml. solvent are then distilled off and a solution of 80 g. sodium hydroxide in 300 ml. methanol is added to the reaction mixture. The mixture is heated under reflux for 2 hours, then, half the solvent is distilled off. The residue is diluted with 1 litre of water and 3-nitro-4-ethylmercaptophenol is precipitated by acidifying with dilute hydrochloric acid. The precipitated oil is separated off and dissolved in dilute sodium hydroxide solution, animal charcoal is added, the mixture is filtered and the oil reprecipitated with hydrochloric acid. Ice is then added and the mixture stirred until the oily precipitate of 3-nitro-4-ethylmercaptophenol is crystallized. The yellow crystalline compound is removed by suction filtration, washed with water and dried in vacuo at 30° C.

*Yield.*—135 g. (i.e. 68% of the theoretical yield).

3-nitro-4-ethylmercaptophenol crystallizes from benzene in orange red crystals of M.P. 89–91° C.

*Analysis.*—$C_8H_9NO_3S$ (199.2). Calculated: C, 48.24; H, 4.56; O, 24.10; N, 7.03; S, 16.07. Found: C, 48.25; H, 4.82; O, 23.50; N, 7.27; S, 15.90.

EXAMPLE 16

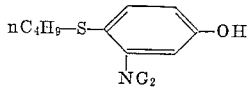

By a method similar to Example 15, 251.5 g. (=1 mol) methane-sulphonic acid-(4-chloro-3-nitro)-phenyl ester are reacted with n-butyl-mercaptan and ethanolic potassium hydroxide solution in methyl ethyl ketone.

*Yield.*—145 g. 3-nitro-4-butyl-mercaptophenol (i.e. 64% of the theoretical yield).

The compound crystallizes from benzene/ligroin in yellow brown crystals of M.P. 61°–62° C.

*Analysis.*—$C_{10}H_{13}NO_3S$ (227.2). Calculated: C, 52.86; H, 5.77; O, 21.12; N, 6.17; S, 14.08. Found: C, 52.59; H, 5.69; O, 21.90; N, 6.21; S, 13.65.

EXAMPLE 17

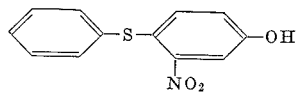

126 g. (=0.5 mol) methane-sulphonic acid-(4-chloro-3-nitro)-phenyl ester are suspended in 400 ml. acetonitrile. A solution of 36.5 g. (=0.65 mol) KOH and 99 g. (=0.9 mol) thiophenol in 250 ml. ethanol is then added dropwise in the course of 3 hours at 15° to 20° C. with stirring. The mixture is stirred for 24 hours at room temperature and acetonitrile is then distilled off. 750 ml. water and 150 ml. 40% sodium hydroxide solution are then added and the mixture is heated with stirring for ½ hour at 95° C. The deep red solution is acidified whilst hot with hydrochloric acid. 3-nitro-4-phenylmercaptophenol precipitates as red crystals on cooling. It is removed by suction filtration and dried in vacuo at 50° C. (yield 120 g.; M.P. 136°–139° C.). The compound crystallizes from benzene in red needles of M.P. 146°–147° C.

*Yield.*—100 g. (i.e. 81% of the theoretical yield).

*Analysis.*—$C_{12}H_9NO_3S$ (247.3). Calculated: C, 58.30; H, 3.67; O, 19.42; N, 5.67; S, 12.94. Found: C, 58.13; H, 3.79; O, 18.75; N, 5.61; S, 13.1.

EXAMPLE 18

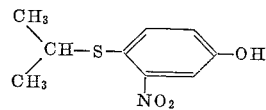

In a similar manner to Example 17, 126 g. (=0.5 mol) methane - sulphonic acid - (3 - nitro - 4 - chloro) -phenyl ester in 400 ml. acetonitrile are treated with 56.5 g. (=0.65 mol) potassium hydroxide in 250 ml. ethanol and 50.5 g. (=0.665 mol) isopropyl-mercaptan to form 3-nitro-4-isopropylmercapto-phenol.

The crude product (102 g.) is recrystallized from a 1:1 mixture of benzenes and ligroin and is obtained as orange-red crystals of M.P. 79° to 80° C.

*Yield.*—80 g. 3-nitro-4-isopropylmercapto-phenol (i.e. 75% of the theoretical yield).

*Analysis.*—$C_9H_{11}NO_3S$ (213.2). Calculated: C, 50.70; H, 5.20; N, 6.57; O, 22.52; S, 15.01. Found: C, 50.71; H, 5.22; N, 6.71; O, 21.98; S, 14.7.

EXAMPLE 19

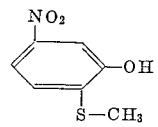

73 g. (=1.3 mol) powdered potassium hydroxide are suspended in 400 ml. dimethylformamide. 30 litres of gaseous methyl mercaptan are introduced into this suspension with cooling. The potassium hydroxide dissolves and a solution of potassium methyl mercaptide in dimethylformamide is obtained.

This mercaptide solution is slowly added dropwise at 14°–17° C., to a solution of 251.5 g. (=1 mol) methane-sulphonic acid-(2-chloro-5-nitro)-phenyl ester (preparation analogous to that in Example 1A, M.P. 108–109° C.) in 500 ml. dimethylformamide, and the mixture is stirred for another 24 hours at room temperature. The reaction mixture is worked up as in Example 5.

2-methyl-mercapto-5-nitro-phenol is precipitated as yellow crystals and crystallizes from benzene in the form of yellow green crystals of M.P. 146°–147° C.

*Yield.*—158 g. (i.e. 86% of the theoretical yield).

*Analysis.*—$C_7H_7NO_3S$ (185.2). Calculated: C, 45.41; H, 3.81; N, 7.57; O, 25.92; S, 17.28. Found: C, 45.65; H, 4.00; N, 7.45; O, 26.20; S, 16.80.

We claim:
1. A monomercapto-mononitrophenol selected from the group of

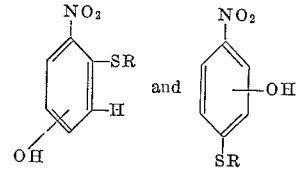

wherein R is a member selected from the group consisting of alkyl, hydroxy alkyl, carboxyalkyl, toluyl, chlorophenyl and methoxyphenyl.
2. 3-nitro-4-methylmercapto-phenol.
3. 3-nitro-4-n-dodecylmercapto-phenol.
4. 5-nitro-2-methylmercapto-phenol.

5. 3-(2-hydroxy-ethylmercapto)-4-nitrophenol.
6. 3-(carboxymethylmercapto)-4-nitrophenol.
7. 2-nitro-5-methylmercapto-phenol.
8. 3-methyl-mercapto-4-nitrophenol.
9. 3-butyl-mercapto-4-nitro-phenol.

References Cited

Galt et al.: J. Chem. Soc., 1959.

CHARLES B. PARKER, *Primary Examiner.*

DELBERT R. PHILLIPS, *Assistant Examiner.*

UNITED STATES PATENT OFFICE
CERTIFICATE OF CORRECTION

Patent No. 3,350,459                      October 31, 1967

Heinrich Pelster et al.

It is hereby certified that error appears in the above numbered patent requiring correction and that the said Letters Patent should read as corrected below.

Column 1, lines 65 to 72, the left-hand formula should appear as shown below instead of as in the patent:

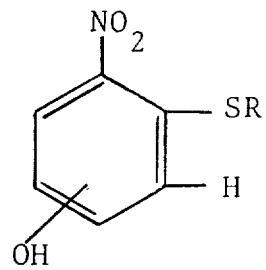

column 2, about line 42, above the second arrow insert -- -KCL --; column 8, line 60, for "recrstallization" read -- recrystallization --; column 9, lines 45 to 48, the formula should appear as shown below instead of as in the patent:

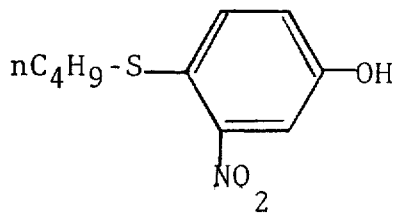

Signed and sealed this 26th day of November 1968.

(SEAL)
Attest:

EDWARD M. FLETCHER, JR.                EDWARD J. BRENNER
Attesting Officer                         Commissioner of Patents